Figures 1, 2:
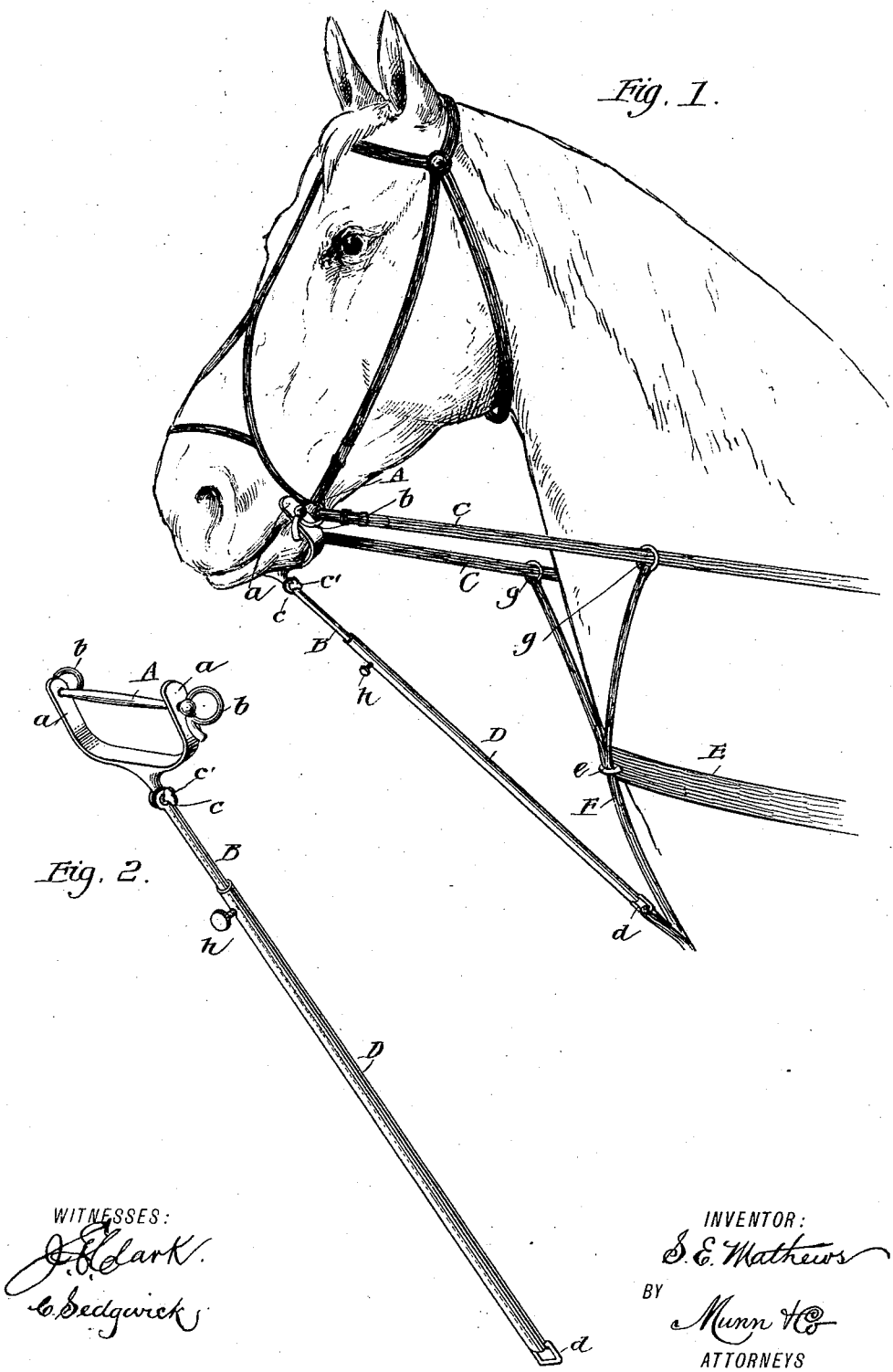

(No Model.)

S. E. MATHEWS.
MARTINGALE ATTACHMENT FOR HARNESS.

No. 444,648. Patented Jan. 13, 1891.

WITNESSES:
J. E. Clark.
C. Sedgwick.

INVENTOR:
S. E. Mathews
BY
Munn & Co.
ATTORNEYS

UNITED STATES PATENT OFFICE.

STILLMAN E. MATHEWS, OF FULLERVILLE, NEW YORK.

MARTINGALE ATTACHMENT FOR HARNESS.

SPECIFICATION forming part of Letters Patent No. 444,648, dated January 13, 1891.

Application filed September 25, 1890. Serial No. 366,108. (No model.)

*To all whom it may concern:*

Be it known that I, STILLMAN E. MATHEWS, of Fullerville, St. Lawrence county, and State of New York, have invented a new and Improved Martingale Attachment for Harness, of which the following is a full, clear, and exact description.

This invention relates to an improved device for the control of horses, and has for its object to provide a novel appliance which will coact with an ordinary riding or driving bridle, and afford means to control the head of the animal and retain it at any desired angle of elevation.

To this end my invention consists in the construction and combination of parts, as hereinafter described and claimed.

Reference is to be had to the accompanying drawings, forming a part of this specification, in which similar letters of reference indicate corresponding parts in both the figures.

Figure 1 represents the device in position upon a horse, and Fig. 2 is an enlarged detached view of the appliance.

The invention, in brief, comprehends the provision of a brace of rigid material, which is adjustable in its parts, and which affords an extensible connection between the bit of the bridle and the breast-strap of the harness, whereby the head of the animal is retained from improper elevation without regard to the condition of the driving-reins, and rearing or kicking prevented.

The bit A is secured in the parallel limbs $a$ of a bifurcated rod B. The bit, being free to turn in the limbs, is provided with the usual rings $b$, whereon the driving-reins C are connected. The proportionate dimensions of the limbs $a$ and their degree of separation is such that they will be adapted to lie on each side of the lower jaw of the animal when in position and also extend below said jaw, as shown in Fig. 1.

At a point adjacent to the junction of the limbs $a$ the rod B is divided into two parts, which are adjustably connected by a knuckle-joint $c$, which is so constructed that the bolt $c'$, which connects the parts, may be set up with sufficient pressure to hold the rod portions rigid at any desired angle they may be required to maintain, or secure the rod B and fork-limbs $a$ in the same plane.

An elongated sleeve D is provided of such caliber as will admit the rod B, of which it forms a tubular extension, the lower end of the sleeve having a loop $d$ attached, which is secured by any suitable means to the breast-collar E. As shown, the loop $d$ is connected to a depending portion of an ordinary martingale F, which is secured firmly at $e$ to the breast-collar E, and branches above the collar to loosely connect the reins C, as at $g$ in Fig. 1.

If preferred, the upper portion of the martingale-straps F may be dispensed with and the lower portion whereon the sleeve D is connected extended from the collar E between the fore legs of the horse to be attached to the girth-strap or belly-band in an obvious manner.

The set-screw $h$ has a threaded engagement with the sleeve D near its upper terminal, and when firmly adjusted against the body of the rod B will retain the rod and sleeve in firm connection at any desired point of longitudinal adjustment.

In use, the appliance being attached to the animal in the manner described, and as represented in Fig. 1, it will be evident that the vertical movement of the head of the horse will be prevented, while lateral movement is permitted.

It is well known to horsemen that if the nose of the horse is held depressed at a proper angle rearing or kicking will be prevented. Hence the use of the stiff martingale herein described will curb a vicious animal, prevent "shying," and obviate the necessity for keeping a taut rein on a tricky horse at all times while driving or riding.

If desired, the bit A may be attached to the limbs $a$ without passing through them, as such a connection can be effected by straps or other equivalent means, and permit the ready removal of the martingale attachment from the bridle.

Having described my invention, I claim as new and desire to secure by Letters Patent—

1. A martingale attachment for harness, comprising a rigid rod which is forked at one end, has a bit-bar across the limbs of the fork that may be connected to a bridle, and a sleeve which slides on the rod, is securable thereon, and also attachable to the breast-collar or a strap of the harness, substantially as set forth.

2. A rigid martingale for harness, comprised, essentially, of a bifurcated rigid rod having a bridle bit-bar attached to the limbs of its bifurcated portion, a knuckle-joint on the rod near the bifurcated end, and a rigid sleeve that is adapted to slide on the rod and be secured thereon at any point of longitudinal adjustment and also attachable to the breast-collar or a strap of the harness, substantially as set forth.

STILLMAN E. MATHEWS.

Witnesses:
H. S. CONKLIN, Jr.,
DAVID FRASER.